United States Patent Office 2,873,728
Patented Feb. 17, 1959

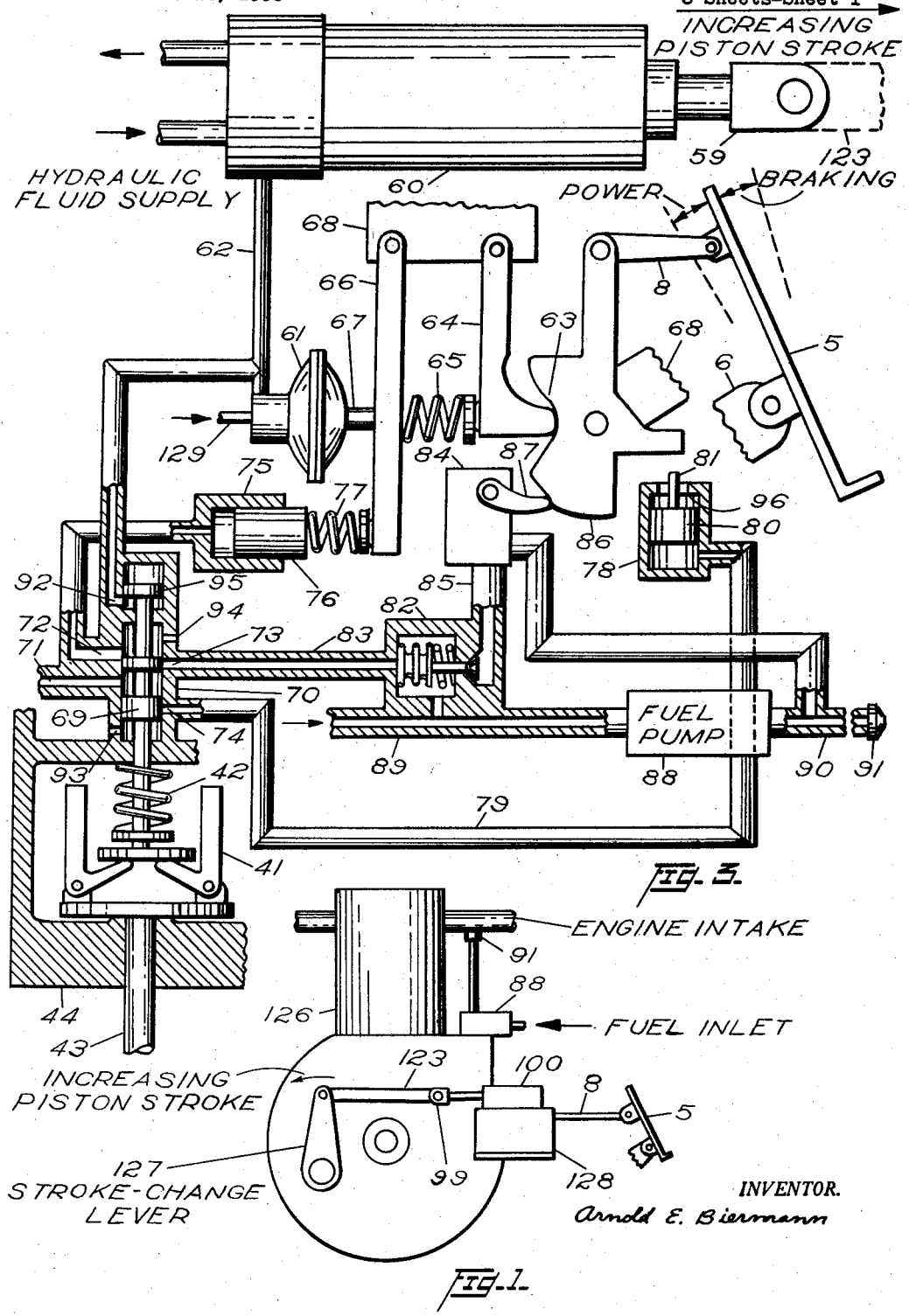

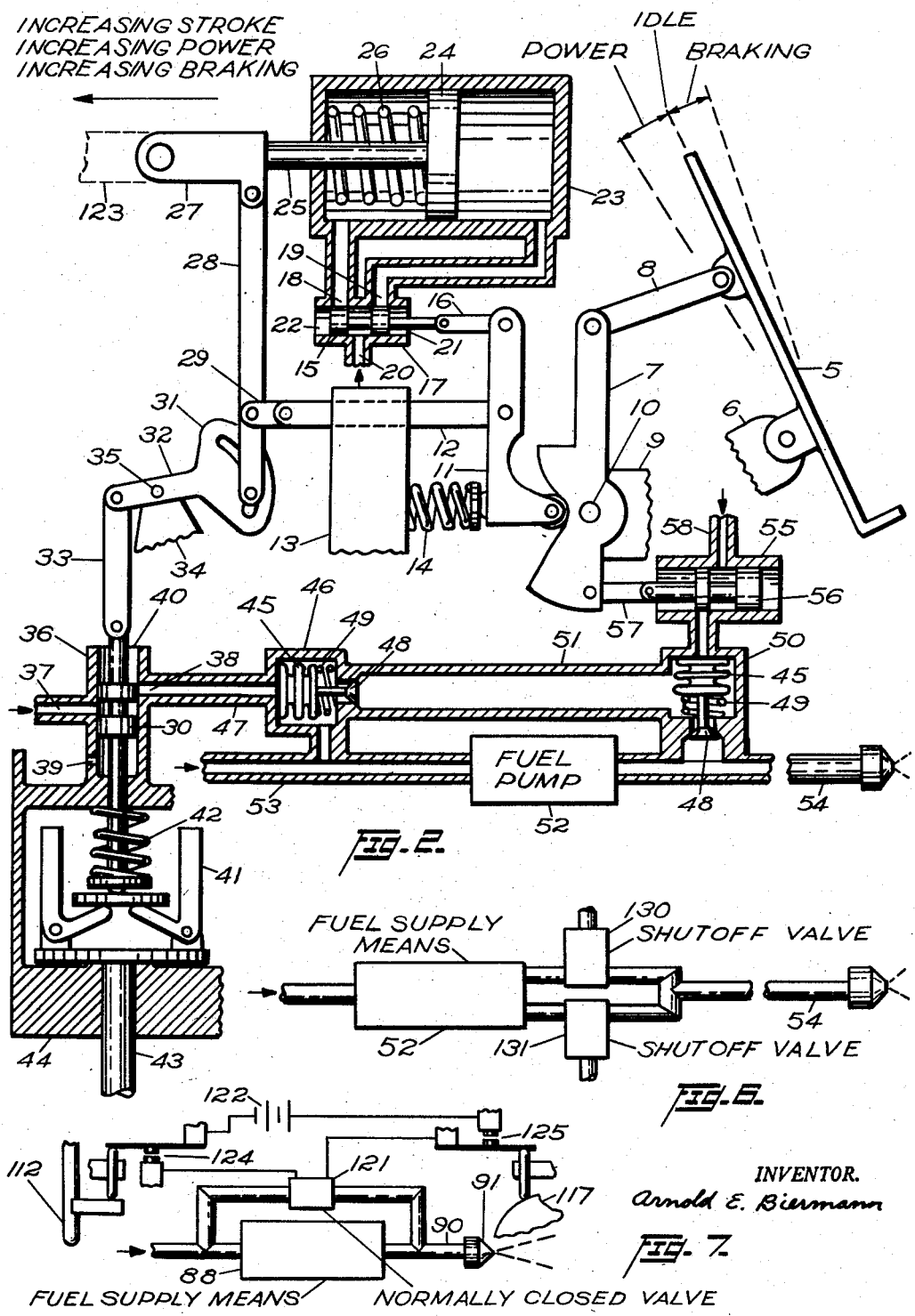

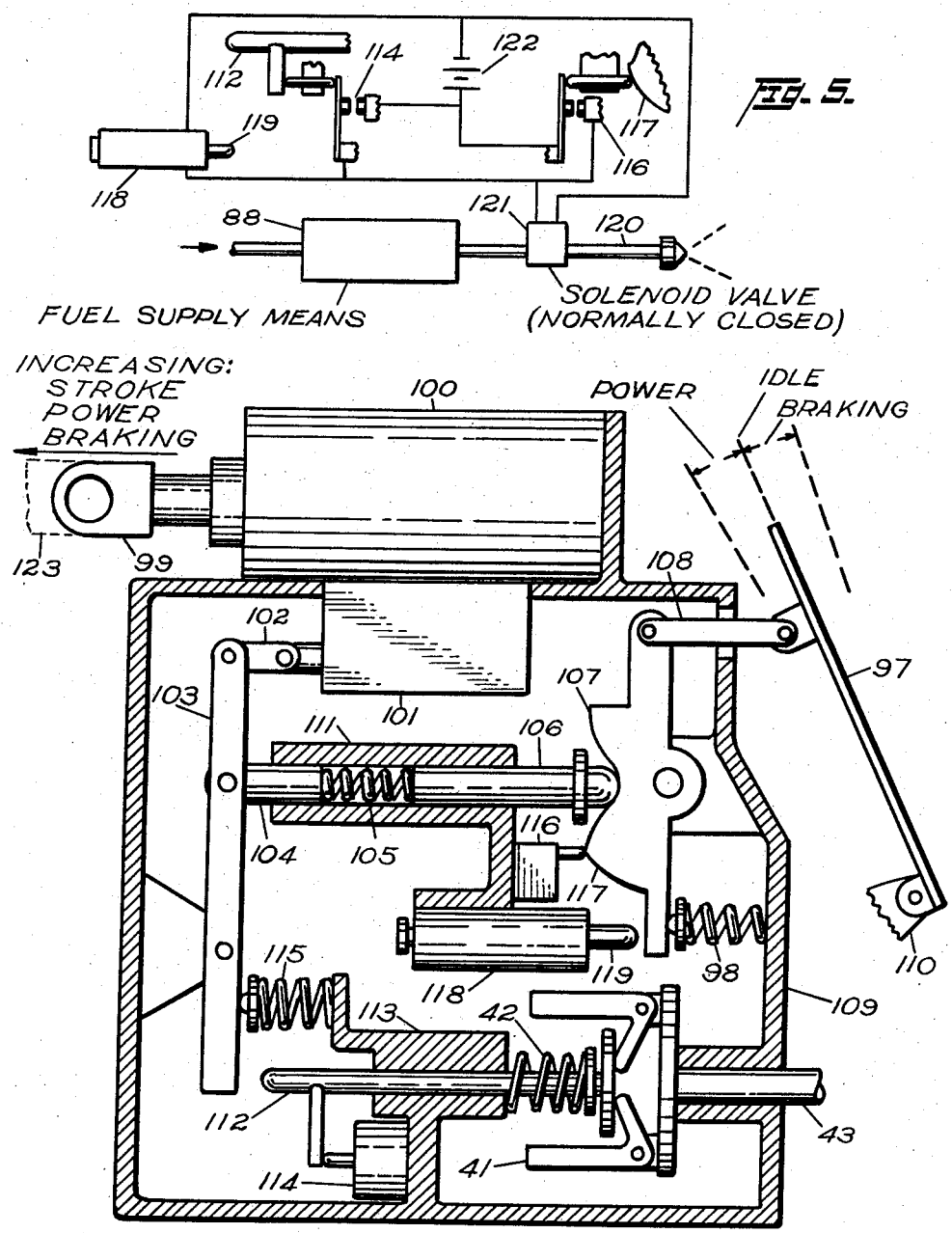

2,873,728

CONTROL SYSTEMS FOR VARIABLE STROKE ENGINES

Arnold E. Biermann, Fairview Park, Ohio

Application February 20, 1956, Serial No. 566,693

8 Claims. (Cl. 123—48)

This invention relates to control systems for internal combustion engines for automotive use. The main object of the invention is to provide a control system for variable stroke piston engines which will permit the use of the engine for power and as a braking device with modulated control.

In the variable stroke piston engine, power is varied by changing the piston stroke. The intake air throttle, if provided at all, is left substantially open throughout the power range. This type of engine and mode of operation is especially efficient at part load because piston friction and pumping losses are reduced to a minimum. Some variable stroke mechanisms are adapted to engines of very large displacement without a corresponding increase in the bulk of the engine. With such a mechanism it thus becomes feasible to provide an automobile engine with as much as three times the normal engine displacement and at the same time achieve efficient operation in the low power range. The mechanism for varying the stroke of a variable stroke piston engine is fully disclosed in my co-pending application, Serial No. 519,314, now Patent No. 2,822,791.

A variable stroke engine having three times the displacement of the conventional engine would also provide three times as much friction or engine braking when the fuel is cut off and the piston stroke is extended to maximum value. Substantial amounts of engine braking contribute to both the safety and convenience of driving. In the past, the complete absence of engine braking as provided by "free-wheeling" devices proved unacceptable for the automobile because of the lack of inherent braking characteristics during emergencies. In addition, "free-wheeling" was inconvenient as it required an excessive use of the brakes.

One object of this invention is to provide an automatic control system that will furnish a modulated power control range and furnish a modulated engine braking range, all obtainable from a single pedal or lever. Both ranges are obtained by varying the piston stroke of the internal combustion engine. The braking range is obtained without consumption of fuel. Another object of the invention is to provide automatic means to prevent the engine from stalling regardless of the mode of operation.

A further object of the invention is to provide automatic means whereby the engine speed is limited as a function of piston stroke. It is desirable that the engine speed be limited as a function of stroke in both the power and the braking ranges of the variable stroke engine.

Another general object is to provide a control system for use with a conventional internal combustion engine in which a modulated braking range is desired. For simplicity, however, the invention will be described in terms of the variable stroke piston engine.

My invention is capable of embodiment in many different forms, but by way of illustration I have shown only three forms thereof in the accompany drawings in which:

Figure 1 is a schematic illustration showing the main components of the invention.

Figure 2 is a diagrammatic illustration of one form of the invention.

Figure 3 is a diagrammatic form of a second form of the invention.

Figure 4 is a diagrammatic illustration of a third form of the invention.

Figure 5 is a diagram showing the electrical wiring circuit for the third form of the invention, as shown in Fig. 4.

Figure 6 is a schematic diagram showing a parallel arrangement of fuel shutoff valves.

Figure 7 is a wiring diagram for the embodiment of the invention shown in Figure 4 in which the fuel valve is installed in a bypass arrangement.

Figure 1 shows the main elements of the invention in which 126 is a variable stroke piston engine having a stroke-change lever 127 driven by a servomotor 100 from piston rod 99 and link 123. The control system mechanism, which generally comprises a speed sensing means driven from the engine and other regulating means, is contained in box 128. As used for automobiles the control lever 5 consists in a foot pedal connected to the control mechanism with link 8. The control lever has a neutral position at which the engine idles. On one side of the neutral position engine power is increased by increasing the piston stroke of the engine. On the other side of the neutral position engine braking is increased by increasing the piston stroke with fuel to the engine shut off. For convenience of illustration in this specification it will be assumed that an outward movement of the servomotor piston rod increases the stroke of the internal combustion engine and that this increase in stroke either increases the power of the engine or increases the frictional drag or engine braking of the engine. The fuel supply system for the engine would generally consist in a pump 88 and fuel nozzle 91.

An understanding of the invention is best obtained by first reviewing the specific objectives. The functions of the control system are as follows:

I. To increase the piston stroke and engine power as the control pedal is moved into the power range.

II. To increase the piston stroke and engine braking as the control pedal is moved into the braking range.

III. To shut off the fuel to the engine when the control pedal is moved into the braking range, providing the engine speed is greater than idling speed.

IV. To admit fuel to the engine if the engine speed falls to idling during engine braking.

V. To reduce piston stroke to idling value if engine speed falls to idling value during braking.

VI. To return the foot pedal or control lever to idling position during idling operation and when the engine is not operating.

VII. To limit the piston stroke as a function of engine speed during power and during braking operation.

In the drawings, referring first to Figure 2, the control pedal 5 is pivoted on a supporting structure 6 and is linked to the rocker cam 7 by means of link 8, as shown. Rocker cam 7 is pivoted to a supporting structure 9 with pin 10. The cam follower 11 is pivoted to the actuating shaft 12 which is slidably mounted in the supporting structure 13. Cam follower 11 is held to the rocker cam 7 by the spring 14. The cam follower 11 is linked to the cylinder control valve 15 by means of cam follower link 16. The control valve 15 is mounted in the valve body 17 in which are located cylinder ports 18 and 19, intake port 20 and discharge ports 21 and 22. Cylinder ports 18 and 19 communicate with the power cylinder 23 through the passages shown. Piston 24 and piston rod 25 are mounted in the power cylinder 23 and are normally forced to one end of cylinder 23 by piston spring 26. Piston rod end 27 is connected to actuating shaft 12 by means of actuating lever 28 and follower link 29. The actuating lever 28 is connected to speed sensor valve 30 through cam 31 and lever 32 and sensor valve link 33. Lever 32 is pivoted on the supporting structure 34 by pin 35 as shown. Speed sensor valve 30 is mounted in valve body 36 in which is located intake port 37, communications port 38 and discharge ports 39 and 40. Speed sensor valve 30 is actuated by centrifugal weights 41 which are restrained by spring 42 as shown. The speed sensor weights 41 are driven by shaft 43 which is journalled in a supporting structure 44 and driven by some convenient means from the engine. Communications port 38 is connected to the bellows 45 of the fuel shutoff valve 46 through tube 47. Poppet valve 48 is actuated by the bellows 45 in conjunction with the spring 49. Fuel valve 50 is similar to valve 46 and is installed in the bypass line 51 around fuel pumping means 52 as shown. Fuel is supplied the fuel pumping means through tube 53 and is discharged into the engine through tube 54. Fuel bypass valve 50 is actuated by hydraulic fluid from valve 55. The spool valve element 56 of valve 55 is actuated by rocker cam 7 through link 57. In the control system of Figure 2 hydraulic fluid is supplied ports 58, 20 and 37 from a central supply system.

In the operation of the control system shown in Figure 2, engine power is increased by moving pedal 5 into the power sector. This movement moves piston rod 25 to increase piston stroke. A portion of the motion of rod 25 is fed back to valve 17 so that there is a unique position of rod 25 for every position of pedal 5. Engine braking is produced by moving pedal 5 into the braking sector. This movement positions rod 25 in the same manner as for the power sector. Thus, if rod 25 of the power cylinder is arranged to actuate a stroke-change mechanism of a variable stroke piston engine the power is increased by lengthening the stroke and likewise, engine braking is increased by lengthening the stroke.

The piston rod 25 of the power cylinder may also be used for actuating throttling or other braking means of conventional internal combustion engines.

Another function of this control system is to cut off the fuel supply to the engine when engine braking is desired. Fuel delivery is cut off by bypassing the fuel around the fuel pump back into the intake side of the pump by means of valve 50 and valve 46. Valve 46 is normally open when the engine speed is greater than idling speed.

When pedal 5 is in the braking sector, valve 50 is opened by hydraulic pressure from valve 55. The closing of either of these valves will resume fuel flow to the engine. This bypass system requires that the fuel delivery line 54 be provided with a pressure relief valve or a spring-loaded fuel nozzle. It should be observed that fuel delivery can also be cut off by using shut off valves 130 and 131 installed in parallel delivery lines as shown in Figure 6. These valves are designed to close with the application of hydraulic pressure. In this case the opening of either of these valves will resume fuel flow to the engine.

A further function of this control system is to provide fuel flow equal to or less than idling. This requirement prevents the engine from stalling. The engine speed is measured by the speed sensor. If engine speed falls below a selected value, valve 46 of Figure 2 is closed and the fuel flow to the engine resumes.

A further object of the invention is to reduce the stroke of the variable stroke piston engine to idling value when the engine speed falls to idling value during braking. Obviously, the fuel cannot be admitted to the engine to resume idling when the piston stroke is greater than for idling. Therefore, as engine speed falls during engine braking it is necessary to reduce piston stroke. This reduction of stroke is accomplished by the speed sensor control of the servo-valve 15 through cam 31 and lever 32. As the speed falls the speed sensor shaft is lowered, which in turn moves rod 27 to reduce stroke. The curvature of the slot in cam 31 is such as to force piston 24 to a decreased stroke position as the speed sensor shaft is moved into the low speed range and also to force piston 24 to a decreased stroke position as the speed sensor shaft is moved into the extreme high speed range.

Another object of the invention is to limit the piston speed of the variable stroke engine or to limit piston stroke as a function of engine speed. Piston speed is limited through the speed sensor control of piston stroke. At high speeds the speed sensor shaft is forced upward and the lever 32 and cam 31 force servo-valve 15 to reduce piston stroke. It is thus apparent that maximum piston stroke is a function of engine speed. At high speeds stroke is limited. The relationship between maximum stroke and speed can suit the requirements through the design of cam 31. For example, the cam can be designed to limit the product of speed and stroke to a constant value (constant average piston speed).

Figure 3 illustrates another form of the invention in which the position of the piston and the piston rod 59 of the servo-cylinder 60 is remotely controlled by a modulated hydraulic pressure from the pressure regulator 61. The pressure regulator is supplied with hydraulic fluid through tube 129. The output pressure from the pressure regulator 61 is controlled from the foot pedal 5 through link 8 which actuates rocker cam 63, cam follower 64, spring 65, and lever 66 which bears against the input pin 67 of the pressure regulator 61. The rocker cam 63, the cam follower 64 and the lever 66 are all pivoted to the frame 68 of the device. The speed sensor is similar to that shown in Figure 2. The hydraulic valve element 69 which is actuated by the speed sensor is mounted in the valve body 70. Intake port 71 and ports 72, 73, 74, 92, 93 and 94 are located in the valve body 70. Port 92 communicates with tube 62. Port 72 communicates with cylinder 75 in which piston 76 is located. Piston 76 is adapted for applying a force to lever 66 through spring 77. Port 74 of the valve housing 70 communicates with cylinder 78 through tube 79. Piston 80 with rod 81 is mounted in cylinder 78 for operable association with rocker cam 63. Port 73 of valve housing 70 communicates with fuel bypass valve 82 through tube 83. Fuel bypass valve 82 is connected in series with mechanically-operated fuel bypass valve 84 through tube 85. Mechanically-operated fuel bypass valve 84, which is operated from cam surface 86 of rocker cam 63 through cam follower 87, is connected to the discharge side of fuel pump 88. Tube 89 supplies fuel to fuel pump 88 from an outside source. Fuel is delivered to the engine through tube 90 and nozzle 91.

In the operation of the embodiment of the invention shown in Figure 3, piston rod 59 is normally extended by moving pedal 5 into either the power range or into the braking range. This is done by applying a unique force to the pressure regulator 61. The greater the force on the regulator, the greater is the extension of the piston rod 59. This force, which is applied to pin 67 is modified by a force from piston 76 when the speed of the speed sensor exceeds specified values. The loading of the speed sensor spring is a function of the centrifugal forces on weights 41 and the force applied to valve element 95. The object of this arrangement is to limit the extension of piston rod 59 as a function of engine speed. If piston rod 59 is connected to the stroke-change mechanism of a variable stroke engine the object is to limit the piston speed or stroke of such an engine to practical values. Because piston speed is a function of both engine speed and piston stroke it is necessary to make the maximum extension of rod 59 a function of its position with respect to engine speed. With the arrangement shown in Figure 3 maximum extension of rod 59 is obtained up to a specified speed. Any further increase in speed serves to admit pressure to cylinder 75 which reduces the stroke of rod 59. As the speed increases, the extension of rod 59 decreases. This arrangement limits the average linear speed of the pistons in a variable stroke engine in both the power and in the braking ranges.

In Figure 3, it will be observed that if, at a given speed, the stroke of 59 is increased, the increased pressure supplied to tube 62 by regulator 61 also acts upon piston 95 which further compresses spring 42 and opens port 72 wider or sooner. In this manner the stroke of 59 is a function of engine speed and of the position of rod 59.

With this control system the fuel delivery is cut off during engine braking by opening valve 84. This is accomplished by means of cam surface 86. Valve 82 is normally open when the engine speed is above idling speed. Thus, the opening of bypass valve 84 bypasses all fuel back into the pump intake during braking at speeds above idling. At idling speeds the speed sensor closes valve 82 and idling fuel is supplied to the engine.

A further function of this control system is to reduce the stroke of the connected variable stroke engine to idling when the engine speed falls to idling during braking. In this case rod 59 is returned to a minimum extension when the speed falls to idling or lower when pedal 5 is in the braking sector. This requirement is accomplished by supplying hydraulic pressure to piston 80 from the speed sensor valve 69 through tube 79. If speed falls below a certain value piston 80 forces the rocker cam 63 from a braking position to the idling position. The stop 96 at the end of cylinder 78 prevents the piston from interfering with the power range of pedal movement.

Figures 4 and 5 illustrate a third form of the invention in which the foot pedal 97 is forced into the braking range by spring 98. In this embodiment of the invention the position of the piston rod 99 of the servo cylinder 100 is controlled by the servo valve 101, which is actuated by foot pedal 97 through link 102, lever 103, actuating rod 104, spring 105, cam follower 106, rocker cam 107 and connecting link 108. Lever 103 and rocker 107 are pivoted to the frame 109. Pedal 97 is pivoted to a supporting structure 110. The actuating rod 104 and the cam follower 106 are slidably mounted in guide 111 of frame 109. The speed sensor is similar to that shown in Figure 2. The speed sensor output shaft 112 is slidably mounted in guide 113 of frame 109 to co-act with lever 103 and with electric switch 114. Spring 115 is mounted on frame 109 to provide an opposing force for spring 105. Electric switch 116 is actuated by cam surface 117 of rocker cam 107. Electric solenoid 118 is mounted on frame 109 to co-act with rocker cam 107 so that when solenoid 118 is energized the armature 119 forces rocker cam 107 to the idle position.

Figure 5 illustrates the fuel system and the wiring diagram connecting the fuel system of Figure 5 with the control system of Figure 4. Fuel pump 88 supplies fuel to the engine through tube 120. Electrically-operated fuel shutoff valve 121 is installed in the discharge pipe from the fuel pumping means. Valve 121 is connected to the power supply 122 by parallel circuits through speed sensor switch 114 and through cam-operated switch 116. With this arrangement, fuel shutoff valve 121, which is normally closed, is opened at any time that the speed is greater than idling speed and in which the pedal is in the power sector.

In the operation of the embodiment of the invention shown in Figure 4 the foot pedal 97 rests in the full braking position when the speed sensor is at rest and the electrical power is turned off. Energizing the system when the governor is at rest causes solenoid 118 to force pedal 97 to the idle position. The pedal will then move into the braking range providing the speed is greater than idling. When this occurs switch 114 is opened and power is cut off from solenoid 118. Moving the pedal from the idle position into the power or into the braking position actuates the servo power cylinder 100 through servo valve 101. Movement of pedal 97 into either the power or the braking range causes rod 99 to be extended an amount substantially proportional to the extent of the pedal movement.

The amount of the extension of servo rod 99 is limited as a function of speed through the force of governor rod 112 acting on lever 103. If servo rod 99 is connected to the stroke-change mechanism of a variable stroke engine it is apparent that the stroke of the engine will be limited as a function of speed. At high speeds the stroke is limited to low values, and at low speeds long strokes are permitted.

A further function of this control is to cut off the fuel during braking operation. This is accomplished through switch 116 which is actuated by cam surface 117 as pedal 97 moves into the braking range. Switch 116 opens the circuit to valve 121 when the pedal is in the braking sector. If engine speed is greater than idling this closes the fuel valve. In case the speed falls to idling when the pedal is in the braking sector, the speed sensor opens fuel valve 121, by closing switch 114, to permit the engine to idle. At the same time solenoid 118 forces the piston stroke to idling.

Figure 7 illustrates how electrically-operated valve 121 can be used in a fuel bypass line in the manner of the embodiment shown in Figure 2, with the exception that instead of employing valves in series, electrical switches 124 and 125 are placed in series.

The three embodiments of my invention shown in Figures 2, 3 and 4 illustrate several means of accomplishing the desired objectives. The design of Figure 2 embodies direct mechanical control from the foot pedal and from the speed sensor to the servo cylinder with hydraulic control of the fuel flow. Figure 3 embodies hydraulic control of the servo cylinder from the pedal and from the speed sensor with hydraulic control of fuel flow from the speed sensor and with mechanical control of fuel flow from the pedal. Figure 4 embodies direct mechanical control of the servo cylinder from the speed sensor and from the pedal. Fuel flow is controlled electrically.

While I have illustrated my improved control system in detail it will be understood, of course, that I do not wish to be correspondingly limited, but regard my invention as including all changes and modifications coming within the spirit of the invention and the scope of the appended claims.

Having thus described my invention, I claim:

1. A control mechanism for an internal combustion engine comprising a frame, a cam pivoted on said frame, an input control lever for actuating said cam, spring return means for actuating said cam, a cam follower lever fulcrummed on a slide rod mounted in said frame, a servomotor having an input rod and an output rod, a link connecting said cam follower lever to the input rod of said servomotor, a speed sensor driven by said internal combustion engine, hydraulic valving means controlled by said speed sensor, a fuel supply system for said internal combustion engine, fuel bypass valves in series in said fuel supply system, one of said fuel bypass valves being actuated by hydraulic fluid from said speed sensor valve, an hydraulic valve actuated from said cam, one of said fuel bypass valves being actuated by hydraulic fluid from said cam valve, the elements comprising said speed sensor, said input rod and the output rod from said servomotor being connected with linkage means which will modulate the position of said output rod from said servomotor as a function of the output from said speed sensor.

2. A control system for a variable stroke internal combustion engine comprising a servomotor for driving the stroke-change lever means of said engine, said servomotor being controlled by an input pressure loading signal, a speed sensor driven by said engine, a hydraulic control valve operated by said speed sensor, a fuel supply system for said engine comprising a pumping means and fuel system bypass valves, a fuel system bypass valve operable from said speed sensor valve, a manual control lever, a fuel system bypass valve operable by said manual control lever, a hydraulic pressure regulator controlled by said manual control lever for supplying said input pressure loading signal to said servomotor, means for modulating the output from said speed sensor valve as a function of the output pressure from said pressure regulator, means for modulating the input control force to said pressure regulator as a function of the output from said speed sensor valve, a hydraulic piston and cylinder means co-acting with said manual control lever as a function of the output from said speed sensor valve.

3. A control system for a variable stroke internal combustion engine comprising a servomotor for operating the stroke-change lever of said variable stroke engine, said servomotor having an input control rod, a speed responsive means driven by said engine, a manual control lever, linkage means connecting said control lever and said servomotor input control rod, linkage means connecting said speed responsive means and said servomotor input rod, an electrical switch operable from said control lever, a fuel supply system for said engine, an electrically-operated fuel cut-off means for said fuel supply system operable from said control lever switch, an electrical switch operable by said speed responsive means, said electrical fuel cut-off means for said fuel supply system operable from said electrical switch of said speed responsive means, an electrical solenoid co-acting with said control lever, said solenoid being actuated from said electrical switch of said speed responsive means.

4. The combination of a control system and a fuel system for a variable stroke internal combustion engine, a servomotor for driving the stroke-change lever of said engine, a manual control lever, an engine speed sensor, means for actuating said servomotor to increase engine stroke with fuel supplied to the engine in one range of control lever movement and means for increasing engine stroke without fuel supplied to the engine in another range of control lever movement, and means for independently modulating the position of said stroke-change lever as a function of the output from said speed sensor.

5. In a control system for internal combustion engines, a manual control means having an idling position, a power range on one side of said idling position, and an engine braking range on the other side of said idling position, an engine speed sensor, and a second control means operably connected to said speed sensor for returning said manual control to said idling position when the engine speed is at idling or less.

6. In combination, a stroke change lever for a variable stroke piston-type internal combustion engine and a control system therefor, comprising a fuel system for said engine, a manual control lever having an idling position, a power range and an engine braking range, said stroke change lever being positioned by said control lever to increase power in said power range and to increase engine braking in said engine braking range, and a second control means for cutting-off fuel to said engine when said control lever is in said engine braking range except when the speed of said engine is at idling or less.

7. A control system for a variable stroke internal combustion engine having a fuel system comprising an engine speed sensor, a manual control lever, a stroke change lever, means for actuating said stroke change lever in one direction for increasing engine stroke with fuel being supplied to the engine in one range of control lever movement, a second means for actuating the stroke change lever in said one direction without fuel to the engine in another range of control lever movement, and regulating means for independently controlling the stroke change lever in said ranges of control settings as determined by the rotative speed of said engine.

8. A control system for an internal combustion engine comprising a frame, a cam pivoted on said frame, an input control lever for actuating said cam, spring return means for actuating said cam, a cam follower lever pivoted on a slide rod mounted on said frame, a servomotor having an input rod and an output rod, a link connecting said cam follower lever and said input rod, a speed sensor driven by said internal combustion engine, hydraulic valving means controlled by said speed sensor, a fuel supply system for said internal combustion engine, a first fuel valve actuated by hydraulic fluid from said speed sensor valve, an hydraulic valve actuated from said cam, a second fuel valve in parallel with said first fuel valve and actuated by hydraulic fluid from said hydraulic valve, the elements comprising said speed sensor, said input rod and said output rod of said servomotor being connected with linkage means for modulating the position of said output rod as a function of the output from said speed sensor.

References Cited in the file of this patent
UNITED STATES PATENTS

| | | |
|---|---|---|
| 1,940,712 | Ertz | Dec. 26, 1933 |
| 2,168,232 | Messinger | Apr. 1, 1939 |
| 2,198,247 | Grob | Apr. 23, 1940 |
| 2,411,167 | Perry | Nov. 19, 1946 |